(No Model.) 6 Sheets—Sheet 1.

T. B. HARRISON.
TYPE WRITING MACHINE.

No. 394,178. Patented Dec. 11, 1888.

(No Model.) 6 Sheets—Sheet 2.
T. B. HARRISON.
TYPE WRITING MACHINE.

No. 394,178. Patented Dec. 11, 1888.

(No Model.) 6 Sheets—Sheet 3.

T. B. HARRISON.
TYPE WRITING MACHINE.

No. 394,178. Patented Dec. 11, 1888.

FIG. 4

(No Model.) 6 Sheets—Sheet 5.

T. B. HARRISON.
TYPE WRITING MACHINE.

No. 394,178. Patented Dec. 11, 1888.

Witnesses:—
Ira R. Steward.
Cora L. Cadwallader.

Inventor:—
Thomas B. Harrison.
By Francis W. Parker Atty.

(No Model.) 6 Sheets—Sheet 6.

T. B. HARRISON.
TYPE WRITING MACHINE.

No. 394,178. Patented Dec. 11, 1888.

Witnesses:
Ira R. Steward
Cora L. Cadwallader

Inventor,
Thomas B. Harrison
By Francis W. Parker Atty

N. PETERS, Photo-Lithographer, Washington, D. C.

UNITED STATES PATENT OFFICE.

THOMAS B. HARRISON, OF ANDERSON, INDIANA, ASSIGNOR TO THE HARRISON TYPEWRITER COMPANY, OF SAME PLACE.

TYPE-WRITING MACHINE.

SPECIFICATION forming part of Letters Patent No. 394,178, dated December 11, 1888.

Application filed February 12, 1887. Serial No. 227,440. (No model.)

*To all whom it may concern:*

Be it known that I, THOMAS B. HARRISON, a citizen of the United States, residing at Anderson, in the county of Madison and State of Indiana, have invented a new and useful Type-Writing Machine, of which the following is a specification.

My invention relates to type-writers such as are used for ordinary type-writing, and has for its object to provide a cheap, simple, and light type-writer. This object I accomplish by the mechanism illustrated in the accompanying drawings, wherein—

Like parts are indicated by the same letters in all the figures.

Figure 5:
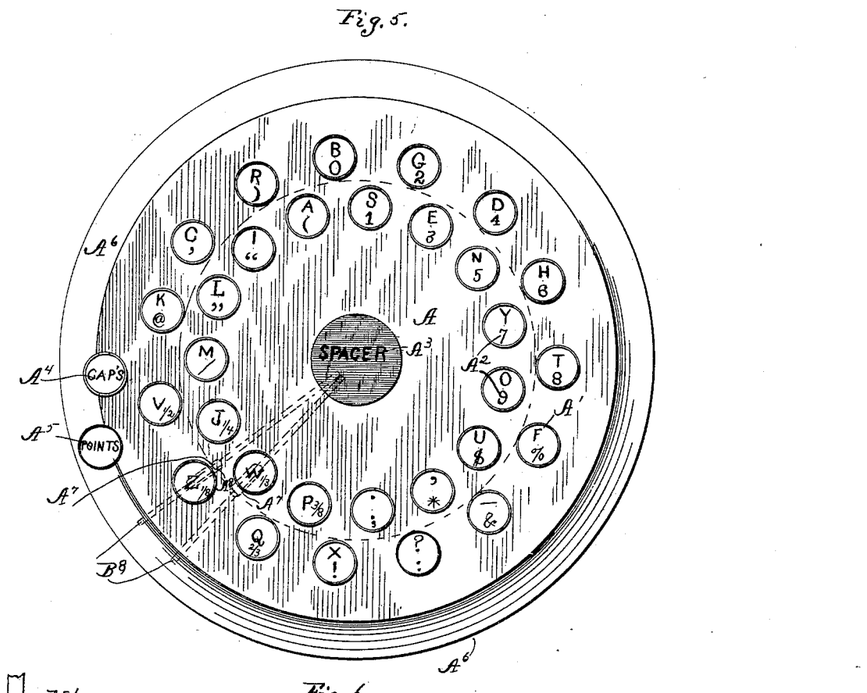
Fig. 5 is a plan view of the key-board.
Figure 6:
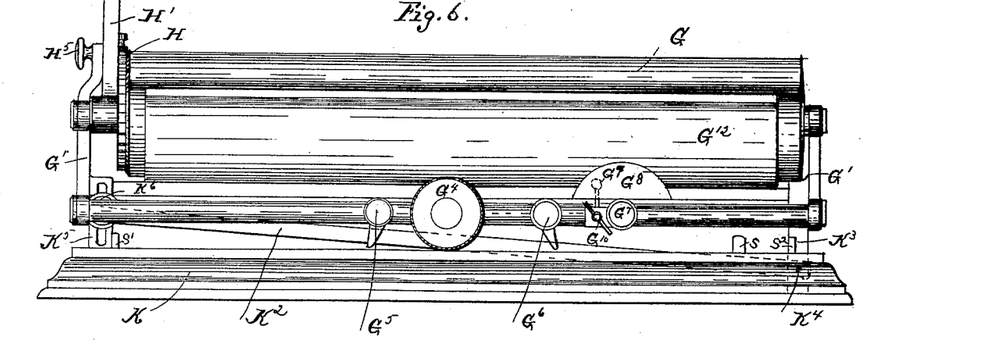
Fig. 6 is a rear view of the printing-roll.
Figure 7:
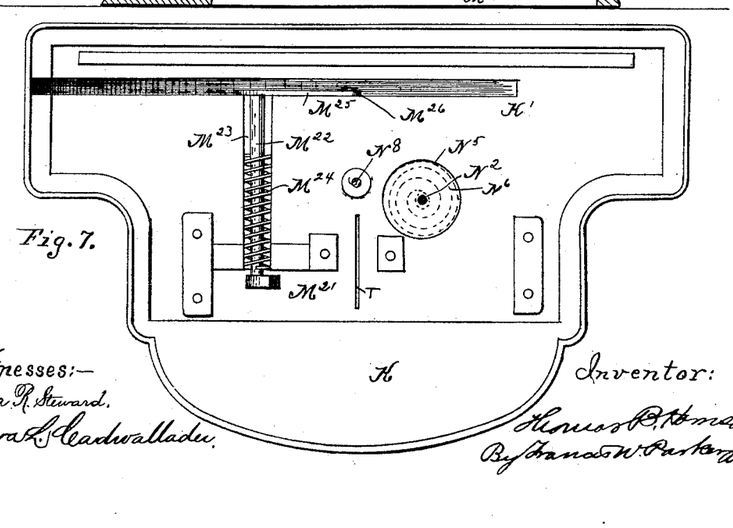
Fig. 7 is a plan view of the base of the machine.
Figure 8:
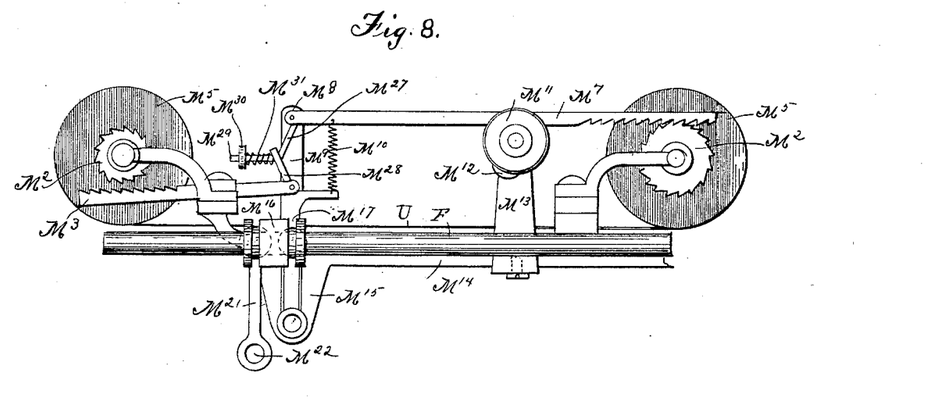
Fig. 8 is an elevation of the ribbon-operating mechanism.
Figure 9:
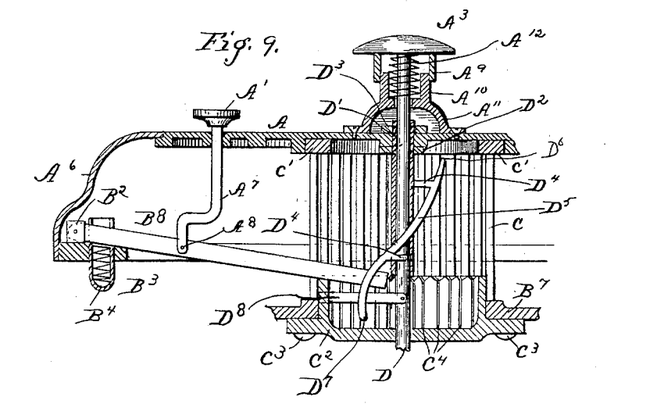
Fig. 9 is a detail section view of the guide-drum.
Figure 10:
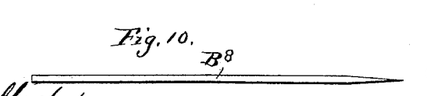
Fig. 10 is a detail of a key-bar.
Figure 11:
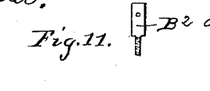
Fig. 11 is a detail of the pivot-block.

A is a key-board, on which are seen the keys $A'$ $A'$, bearing the characters $A^2$ $A^2$; also, the central spacer-key, $A^3$, and the side keys, $A^4$ $A^5$, which are used to change the case, as herein explained.

$A^6$ is a beveled edge about such board, which, together therewith, forms a sort of case.

$A^7$ $A^7$ are key-shanks pivoted to the key-bars at the point $A^8$ and bearing the keys $A'$ $A'$.

$A^9$ is a thimble on the bottom of the spacer-key, which slides upon the portion $A^{10}$ of the inverted cup $A^{11}$, which is secured to the key-board. A spiral spring, $A^{12}$, constantly urges the spacer-key upward. At the base of the case lies the ring B, having therein the screw-holes $B'$ $B'$, to receive the pivot-blocks $B^2$ $B^2$, and also in front of such holes the vertical cylindrical spring-pockets $B^3$ $B^3$, in which lie the spiral springs $B^4$ $B^4$. Attached to this ring, and forming a support for the central part of the machine, is the spider-frame $B^5$, having the legs $B^6$ $B^6$ and central portion or ring, $B^7$. In these pivot-blocks are pivoted the key-bars $B^8$, which are constantly urged upward by the spiral springs $B^4$ $B^4$ in the spring-pockets $B^3$ $B^3$.

C C are vertical rods passing from the circular portion or ring $B^7$ to the ring $C'$ above, thus forming a sort of barrel with a series of vertical ways or guides therein.

$C^2$ is a collar secured to the circle $B^7$ by the bolts $C^3$ and projecting to and inside of the barrel and notched all around its edge, so as to form the slots $C^4$ $C^4$.

D is a rod which passes up through the center of the guide-barrel and enters the sleeve $D'$, and also the spiral spring $A^{12}$. The sleeve $D'$ is provided with a collar, $D^2$, below and a nut, $D^3$, above, whereby it is journaled in the key-board so as to rotate freely, but not to reciprocate. Secured to this sleeve by the supports $D^4$ $D^4$ are the two guideways $D^5$ $D^5$, which together form a miter-shaped cam. These two guideways come together above at the sharp edge $D^6$ and terminate below in the long slot $D^7$, through which projects the arm $D^8$ from the rod D. This arm is limited in its downward motion by the end of the slot $D^7$, and thus it limits the length of the reciprocation of the rod D. It is also long enough to enter the slots $C^4$, and thus when forced downward by the key-bar $B^8$ it is secured in the lock-slots $C^4$ and prevents the cam, sleeve, and rod from further rotating. On this rod is a collar, $D^9$, which rests upon the upper portion of the hammer E. This hammer is pivoted to the central main supporting-shaft, F, and has a large slot, $E'$, to permit the passage of the rod D. At its outer extremity it terminates in a type-hammer, $E^2$. On this hammer E, and continuous therewith, is an escapement-tripper, $E^5$, in the form of a segmental circle, having the slot $E^6$. To keep the hammer always elevated, there is a spiral spring, $E^7$, coiled about the shaft F and attached to the hammer at the point $E^8$, and at its other end secured to a collar, $E^9$, which is adjustably fastened on the shaft by a set-screw, $E^{10}$. Thus by turning this collar the tension of the spring may be changed.

G is a roller-platen journaled in the side pieces, G' G', of the frame, which frame is also provided with the bar $G^2$ and rod $G^3$. On this latter rod are secured the wheel $G^4$ and the adjustable stops $G^5$ $G^6$, and also the bell-slide $G^7$, carrying the bell $G^8$, spring-hammer $G^9$, and a trip-lever, $G^{10}$.

Longitudinal with the frame is a shaft or rod, $G^{11}$, which bears the curved friction-plate $G^{12}$, which guides the paper. $G^{13}$ is a scale on such friction-plate.

On the end of the roller and rigid therewith is a ratchet-wheel, H.

Pivoted concentric with the roller is a lever, H', having a dog, $H^2$, with the spring $H^3$. On the side frame, G', there is an arc-shaped slot, $H^4$, with a set-screw therein, $H^5$, which screw engages the lever H' and limits its motion. On the lever H' there is a pin, $H^6$, projecting into this slot. There is also a spring, $H^7$, on the side frame, which constantly keeps the lever erect.

K is a base-plate having the groove K' therein, said groove forming a way downwardly inclined from right to left. This groove is designed to form a way for the strip $K^2$ to travel in. Attached to the carriage there is an inclined strip, $K^2$, pivoted to a hanger, $K^3$, at one end at the point $K^4$, and at the other end adjustably secured to a hanger, $K^5$, by a lock-nut, $K^6$. This inclined strip travels in the inclined groove in the base. The central supporting-shaft, F, is journaled in standards F' F', and to it are pivoted the frame-pieces $F^2$ $F^2$.

L L are arms rigidly secured to the shaft F F near its bearings F' and pivoted on the pieces $F^2$ $F^2$ in the bosses $L^2$ $L^2$.

$L^3$ $L^3$ are guideways or pins projecting from the frame-pieces $F^2$ at the front ends and passing through the eyes in the hangers $L^4$.

$L^5$ and $L^6$ are crooked key-bars passing from the keys $A^4$ $A^5$ through eyes in the arm $L^7$, which is secured to the main supporting-shaft F. Each of these key-bars bears a nut, $L^8$, adjustably secured upon it, and which rests upon the top of the arm $L^7$. The arms L and $L^7$, together with the shaft F, to which they are secured, form a sort of elbow-crank lever. By depressing either of the keys $A^4$ or $A^5$ the arm $L^7$ will be depressed, the shaft F rotated, the arm L rocked, and the entire upper case will be caused to slide up on its guideways $L^3$. On this frame, which carries the keys, key-bars, and type-wheel, there are shafts M M, supported in the bearings M' M' on the part $F^2$. Each of these shafts M carries a ratchet-wheel, $M^2$, and there is a ratchet-bar, $M^3$, which engages one of such wheels. Each shaft M also is provided with a collar, $M^4$, against which the spool $M^5$ rests. The spool $M^5$ is locked to the shaft, so as to rotate therewith, by means of the pin $M^6$. The spool $M^5$ carries the inking-ribbon.

The corresponding ratchet-bar to the bar $M^3$ is the ratchet-bar $M^7$, pivoted at the point $M^8$ to the vertical lever-bar $M^9$. The ratchet-bar $M^7$ is forced downward by the spiral spring $M^{10}$, but may be raised by means of the hand-wheel $M^{11}$, which carries the cam $M^{12}$ and is supported on the standard $M^{13}$, rising from the cross-piece $M^{14}$. On this cross-piece there is a hanger, $M^{15}$, upon which the lever $M^9$ is pivoted. On the shaft F there is a collar or loose sleeve, $M^{16}$, having the groove $M^{17}$, which is engaged by the pin $M^{18}$ from the lever $M^9$, and a groove, $M^{19}$, which is engaged by the pin $M^{20}$ from the rock-shaft arm $M^{21}$. This arm is rigid with the rock-shaft $M^{22}$, which lies across the frame in the groove $M^{23}$, and is surrounded by and secured to a spiral spring, $M^{24}$, which constantly tends to turn the rock-shaft $M^{22}$ over toward the right. At the opposite end of this rock-shaft is an arm, $M^{25}$, on which is a roller, $M^{26}$, which roller engages the inclined way $K^2$ on the carriage-frame.

The ratchet-bar $M^7$ is provided with an arm, $M^{27}$, which passes through the hole in the corresponding arm, $M^{28}$, on the ratchet-bar $M^3$. On this arm $M^{27}$ are a pin, $M^{29}$, a collar, $M^{30}$, and a spiral spring, $M^{31}$, which spring bears against the arm $M^{28}$ and the collar $M^{30}$, so that when the ratchet-bar $M^7$ is raised by means of the cam $M^{12}$ the spring $M^{31}$ will cause the ratchet-bar $M^3$ to rise, and will thus throw it in contact with the ratchet-wheel $M^2$ on the left. Thus it will be seen as the carriage travels across the machine from right to left its inclined way acts upon the wheel $M^{26}$ and rocks the shaft $M^{22}$, thus moving the sleeve $M^{16}$ on the shaft F and throwing the lever $M^9$ toward the left, and thus turning the ribbon-wheel on the right, so as to gradually move the ribbon toward the right. When it is desired to reverse the action of the ribbon, it is done by turning the hand-wheel $M^{11}$, thus raising the ratchet-bar $M^7$, and, as above explained, bringing the ribbon-spool at the left into operation.

Rising from the center of the base is the curved frame-piece N, having the arm N', in which is journaled the shaft $N^2$, which carries the pinion $N^3$, which engages the rack-bar $N^4$ on the carriage-frame. The shaft $N^2$ projects into the cylinder $N^5$, in which is contained the clock-spring $N^6$, which is secured to the shaft $N^2$, so as to tend to rotate it and move the rack and carriage-frame to the left. The frame-piece N is provided with the pointer or indicator $N^7$ and in its forward end with a vertical shaft, $N^8$, on which is secured the pinion $N^9$, which engages the rack-bar $N^4$ on the carriage-frame. Secured upon this shaft is also a ratchet-wheel, $N^{10}$, a slotted disk, $N^{11}$, locked to such ratchet-wheel by the spring-dog, $N^{12}$. This slotted disk is also provided with an arc-shaped slot, $N^{13}$, and a downwardly-projecting pin, $N^{14}$, and the spring $N^{15}$, secured to the latter pin and bent around and hooked on to a pin, $N^{16}$, which projects upwardly from the lower slotted disk, $N^{17}$, through the slot $N^{13}$. The action of this latter pin is to throw the slotted disk $N^{17}$ around until its pin $N^{16}$ engages the right-hand end of the slot $N^{13}$. Moving in these radial slots $N^{18}$ of the two disks is the segmental tripper $E^5$. When the lower edge of the slot $E^6$ engages the lower disk, the upper edge releases the upper disk and permits the latter to move the distance of the arc-shaped slot $N^{13}$, and when the lower disk is released the upper disk is held by the upper edge of the slot $E^6$ and the lower edge is permitted to rotate the distance of the slot $N^{13}$, which is the distance of one cog on the pinion $N^9$. This permits the rack-bar to move one cog to the left, or the distance of one letter.

O is a type-wheel having type O′ thereon. The type-wheel O is secured against the collar $O^2$ of the shaft D and held in position thereon by means of the pin $O^3$, projecting from such collar, and the spring-washer $O^4$, held against such type-wheel by the nut $O^5$.

S is a pin rising from the base, adapted to trip the lever which operates the bell.

S′ and $S^2$ are pins at the extremity of the base to engage the adjustable stops and limit the motion of the carriage.

T is a slot in which the tripping-segment moves.

The disk $N^{17}$ is loose upon the shaft $N^8$, and the disk $N^{11}$ is locked thereto by means of the ratchet-wheel and spring-dog, so as to be locked to and rotate with the shaft $N^8$, while the carriage moves toward the left, so that when the carriage is drawn back toward the right, the disk $N^{11}$ being held by the tripper, the spring-dog slides upon the ratchet-wheel and the shaft $N^8$ is free to rotate, though both of the disks $N^{11}$ and $N^7$ are kept from rotating.

U is the ribbon.

Figure 14:
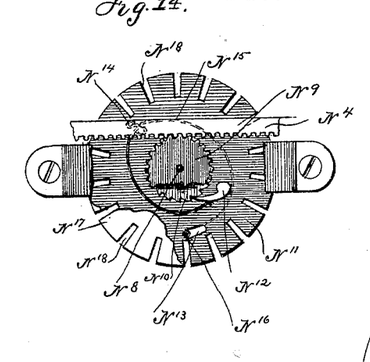
Fig. 14 is a detail bottom view of the escapement mechanism.
Figure 15:
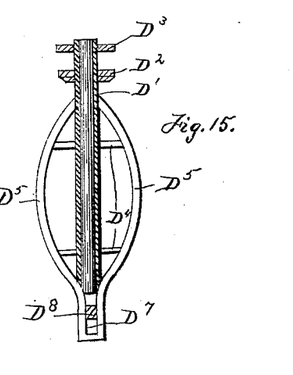
Fig. 15 is a detail of the miter-cam.
Figure 16:
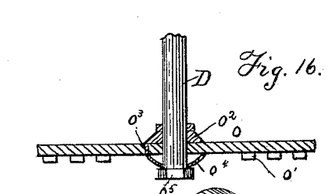
Fig. 16 is a section of the type-wheel.

It will be observed that in Fig. 14 the parts are shown as if turned upside down, in order that the ratchet-bar may be exhibited and the pinion and rack-wheel, and to do this more effectually the lower plate is almost entirely removed, and the pin which projects upwardly from it (marked $N^{16}$) is shown in section.

I have by necessity described many features not of my invention, but necessary to a comprehension thereof, and reference must be had to the claims for a more specific setting out of what I regard as my invention.

The use and operation of my invention are set out in the following-described use and operation of the devices wherein they are contained.

First, the keys, key-board, key-ring, and key-bars; second, the type plate and shaft, miter-cam, type-bar, and guide-barrel for the key-bars; third, the rack, spring-actuated pinion, and an escapement whereby the paper-carriage is driven; fourth, mechanism for feeding the paper; fifth, the ribbon-feeding devices; sixth, a mechanism whereby the type are changed from upper to lower case.

First. The upper part of the machine consists of a ring and case or top thereon, through which latter project the keys arranged in two rings concentric with the case. At the beveled left-hand side of the case are two keys which are used to change the case of the type, and in the center is an elevated spacer-key. Each of these keys bears one character, and some of them two. The characters are indicated upon the surface of the key thus: Key A, bearing the Roman letter A, would print the Roman letter A when the upper-case was being used and the small letter a when the lower-case was being used, and the portion of the brace (when the points, figures, and signs are being used. Each of the keys is supported upon a shank, which shanks are bent on the inner row of keys outwardly and on the outer row of keys inwardly, and then pivoted to the key-bar, so as to engage the bars at equal distances from the pivoted points. Each of these bars is pivoted, as indicated, in a standard on the ring which lies beneath and at the edge of the case, about the circumference thereof. The other end of each of such bars passes between two of the vertical rods, which form the guide-barrel at the center. Each of these key-bars is upwardly forced at its outer extremity by means of a small spiral spring lying in a spring-pocket underneath the bar and a short distance in front of the pivotal point thereof. Thus it will be observed that when any key is depressed its bar will be equally depressed, and that all bars will be equally depressed, also that the key will be constantly returned to its position after use by means of the spiral spring in the spring-pocket. The end of the key-bar is sharp-edged.

Second. At the center of the machine there is found a vertical barrel consisting of upper and lower rings with vertical rods connecting them. Between these rods pass the inner ends of the hammers. Pivoted in the center of this barrel is a sleeve which contains a rod from which projects an arm. On this sleeve is secured a miter-cam, shaped as shown. The sleeve at its upper extremity has a collar and nut, whereby it is suspended from the key-board above, so as to be free to rotate, but not to descend. The cam portion consists of two curved downwardly-inclined ledges, which are united at their upper ends at a sharp edge and terminate at their lower ends in a vertical slot, at the lower extremity of which they are again united. The arm on the type-plate shaft or rod in the sleeve projects through this lower slot, and the parts are so connected and held that the arm never escapes from the slot. The inner ends of the key-bars are in such position as always to be directly above some portion of the miter-cam ledges, and when any such key-bar is depressed it immediately engages such cam, causes it to rotate upon the key-board, and the extremity of such key then descends into such slot and engages the arm from the shaft or rod in the sleeve and forces such arm down to the lower extremity of said slot. About the inner lower end of the guide-barrel is a collar with a series of lock-slots, into which this arm from the rod descends, and thus the rod and plate are centered and securely held in position as it reaches the end of its downward stroke. At the lower end of the rod there is a collar which bears upon the hammer. This hammer is constantly forced upward by a spring, which is coiled about the supporting-shaft, as hereinafter described, so that the type-plate shaft itself is constantly forced upward, and therefore immediately returns to position when any key is released. The pivot-ring, type-case, key-board, keys, key-bars, guide-barrel, miter-cam, and type plate and shaft are supported by arms from the main supporting-shaft, and by arms which slide on guides on a frame pivoted to the same shaft. The entire key bearing and operating mechanism can be moved up or down on such guides. At the outer lower end of the type-shaft is fixed a type-disk, upon which the type are arranged in concentric circles, as shown in the drawings. Each key, when depressed, causes its bar to descend between the rods of the guide-barrel and along the ledges of the miter-cam, thus turning the said cam until its slot is directly below the end of the key-bar. As the cam is so turned the type-shaft is turned with it, thus also turning the type disk or plate on the end of such shaft. This shaft and disk are so arranged with relation to each other and the type on the disk are so placed with reference to the key-bars that as the key-bar which bears, for example, the letter A turns the cam and shaft until it has entered the slot of the cam it brings the letter A on the disk directly under the extremity of the type-bar. As the key-bar further descends into its slot it forces down the arm on the type-shaft and also the hammer and plate, and thus causes the end of the hammer to descend upon the outside of the elastic type-disk which is above the letter, and thus force it down upon the ribbon, so as to make the impression upon the paper. This hammer is pivoted upon the main supporting-shaft of the frame, about which is wound a spiral spring, one end of which engages such hammer and keeps it always elevated when not in use. The other end is secured to a collar adjustably fastened by a set-screw. This hammer is slotted to receive the lower end of the type-shaft. The type-disk is below and the collar on the shaft or rod is above the hammer.

Third. On the front of the paper-carriage, and at the bottom thereof, is a rack which engages the pinion on a sort of a capstan-shaft, the latter being inclosed in a cylinder on the frame. This shaft has wound about it a strong spring like a clock-spring, which tends constantly to unwind it, and thus to rotate the pinion and force the paper-carriage toward the left. The escapement, which regulates the motion of the carriage, toward the left, consists of two slotted plates journaled upon a vertical shaft, the lower secured to the upper by means of a vertical pin, which rises from the lower and passes through the short slot in the upper, and a spring which is secured to a dependent pin on the upper plate at one end and which bears against the pin on the lower plate at the other end. The upper plate is secured by a spring-dog to a ratchet-wheel on the shaft. The pinion on the shaft engages the rack-bar. On the hammer there is a tripper consisting of a segment of a circle, which as the hammer rises and lowers turns about the center, which is also the center of the main supporting-shaft. The edge of this segment is slotted by a slot which is a little narrower at its mouth than the distance between the two slotted plates. This segment engages the slots in the plates. Now when the hammer is depressed the lower plate is first released by the slot in the segment, and when the hammer rises after the type has been depressed and the impression made the upper plate is released just at the moment that the lower plate is again engaged by the segment. The upper plate will thus rotate the distance permitted by the slot in its surface and the pin which projects therein from the lower plate. This slot is of a length equal to the distance between the slots in the circumference of the plates, and of such a length as to permit the rotation of the pinion and its shaft far enough to move the hammer one tooth. This action takes place every time the hammer descends. The spring which connects the two plates is very weak, and only strong enough to bring the lower plate around the length of the slot in the upper when it is released from the segment. The carriage consists of longitudinal pieces, one of which is T-shaped in cross-section, as shown, and which slides in the groove on the base-board. At the other side there is a longitudinal rod having two stops with set-screws, so that the motion of the carriage may be limited in either direction, there being two pins to engage the stops on the base-board. On this rod there is also a wheel which runs on the frame and supports the carriage. Upon it there is also secured an alarm-bell, which is attached by a set-screw, so as to be adjustable in its position. The alarm-bell consists of the sounding portion with a spring-hammer and a pivoted lever which engages a third pin on the base-board, so that the bell is struck when its lever is moved by the motion of the carriage in one direction, but is not sounded when the carriage is moved in the opposite direction. There is another longitudinal rod on the carriage-frame, which supports the friction-sheath on which is the scale.

Fourth. At the extremity of the paper-carriage there is an upwardly-rising frame-piece, upon which the printing-roll is journaled. Concentric with this roll, and secured to it, is a ratchet-wheel; also concentric therewith is a lever-arm which passes upward for a considerable distance. On the said frame of the paper-carriage is an arc-shaped slot concentric with the roller-platen, and in it are fixed a set-screw and locking-piece. The lever-arm has a spring-pawl which engages the ratchet-wheel when the line of type has been written, and it is desired to feed the paper another line the lever-arm is pushed from the operator and its pawl engages the ratchet-wheel and moves the roller-platen the distance on one line. The space between the lines is determined by the position of the set-screw in the arc-shaped slot. There is also a spring on the side frame, which constantly bears against the lever-arm so as to keep it always elevated.

Fifth. The ribbon-feeding device or mechanism for carrying the ribbon is composed as follows: There is an inclined way pivoted to the hanger on the left-hand end of the paper-carrier, and adjustably secured by means of the thumb-screw and bolt to a slotted hanger on the right-hand end of the machine, so as to be upwardly inclined toward the right. This way moves in an inclined groove in the base. Journaled transversely on the base-board at a point a little to the left of the center of the machine is a rock-shaft having two arms, one extending longitudinally with the printing-roll and underneath the same and bearing at its outer extremity a small wheel which runs on the inclined way, the other extending vertically upward and provided with a pin which engages a grooved sleeve on the main supporting-shaft, as will be clearly seen in the drawings. The wheel rolling on the inclined way will rotate the rock-shaft slightly as the carriage moves, and thus cause the sleeve to slide on the supporting-shaft. Now this sleeve is provided with another groove, in which is received a pin on the vertical lever, which is pivoted in hangers below the supporting-shaft and extends a considerable distance above the same, so that the motion imparted to it by the sleeve carries its upper extremity through the space about twice the distance traveled by the sleeve on the shaft. To the upper end of this lever is secured a ratchet-bar, which passes toward the right and engages a ratchet-wheel on a shaft which is suspended in hangers at the side of the frame and carries one of the ribbon-spools. This ratchet-wheel is depressed by a spiral spring, so as constantly to be engaged with the ratchet-wheel on the shaft. At its inner extremity it has a downwardly-turned end, so as to form a sort of bell-crank lever, and this lever engages the upward end of the second bell-crank, which is pivoted to the vertical lever, and whose other end extends toward the left and is provided with a ratchet edge which engages the ratchet-wheel, which in turn operates the ribbon-spool on the left of the machine. The first bell-crank lever has a pin which projects through a slot in the second and bears the spiral spring and collar, as and for the purpose indicated. When one of the ratchets is out of gear, the other is in operation, and they may be alternately used, as is above set forth. The hand-wheel and cam are used to throw the right-hand ratchet out of gear and at the same time to throw the left-hand one in. The ribbon-spools have perforations in both ends, which receive pins in disks on the shaft for which they are designed, so that the spools revolve with their shafts. If it is desired to turn the ribbon so that its edges can be alternately used, it is done by removing the spools and reversing them.

Sixth. At the side of the key-board are placed the two keys marked "Caps" and "Points." The machine in its ordinary position is adapted to write the lower-case letters, and if it is desired to write capitals the key marked "Caps" is depressed. This key has a lower rod screw-threaded and bearing a nut thereon. This lower end of the rod passes through the slot in the arm, which is fastened on the main supporting-shaft of the machine. Another arm from this shaft is pivoted to the case, which carries the keys and parts above described. Now, when the key marked "Caps" is depressed, it operates the arms and shaft, and thus slides the key-case upward on its inclined supports or guides, so as to bring the second row of type in position to be used. When the points, figures, &c., are to be used or the characters on the inner circle, the key marked "Points" is depressed and in like manner it operates the arms and shaft, and, being near to the pivotal point thereof, it slides the key-case farther up its incline. The stops on these two keys limit the length of their stroke, and the length of that stroke can be set by means of the nuts on the screw-threaded lower ends thereof.

Figures 1, 12, 13:
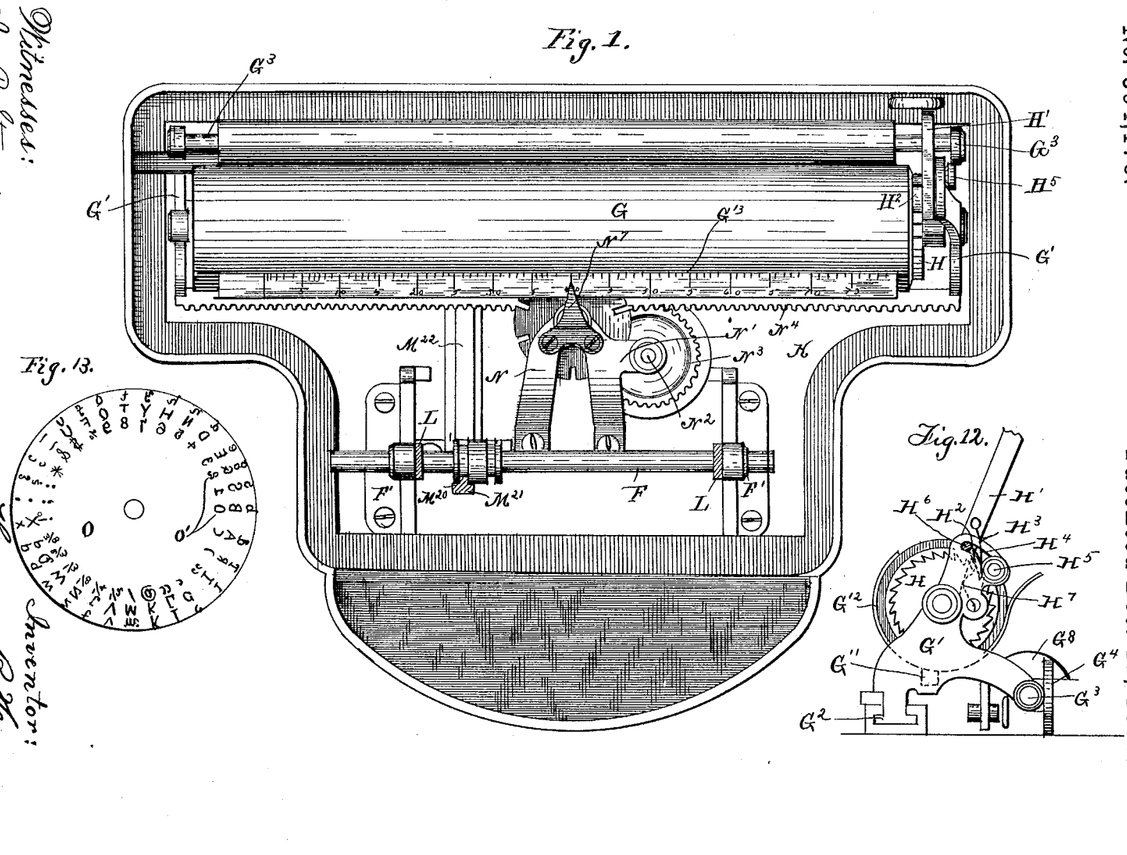
Figure 1 is a plan view of the machine with the upper parts removed.
Fig. 12 is an end view of the roller-platen.
Fig. 13 is a plan view of the type-wheel.
Figure 2:
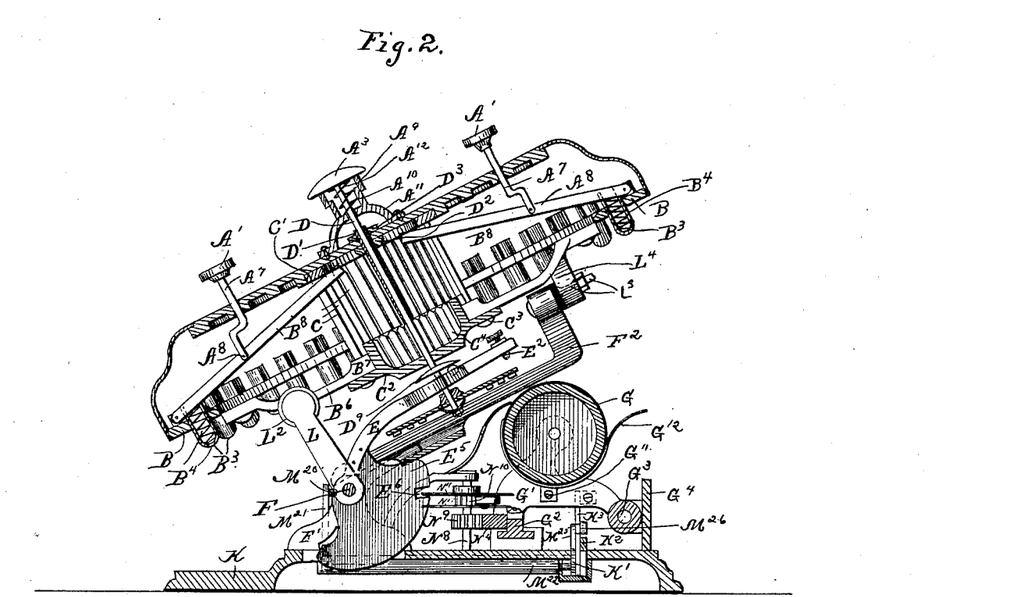
Fig. 2 is a cross-section of the machine with certain parts omitted.
Figure 3:
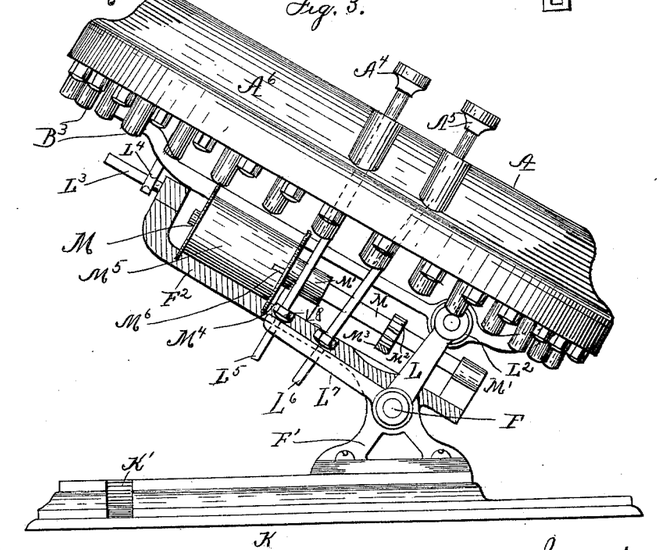
Fig. 3 is a side view of the machine, showing the ribbon-operating mechanism.
Figure 4:
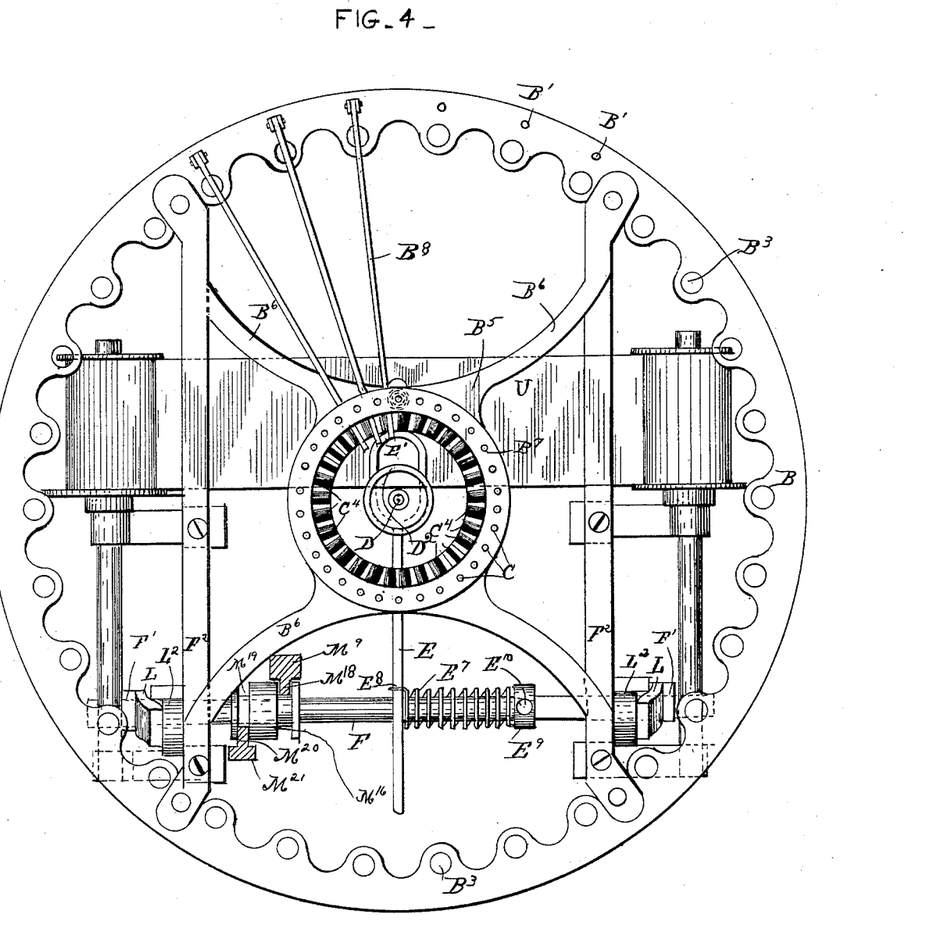
Fig. 4 is a plan view of the machine with the key-board and parts removed.

The machine set up ready for operation, as shown in cross-section, is operated in the following manner: The type desired to be struck is first found on the key-board, and the key bearing it is then depressed. This causes the inner end of said key to pass downward between the vertical rods in the guide-barrel and it engages the ledge of the miter-cam. This causes the latter to rotate, carrying with it the rod which its sleeve contains, and also the type-wheel below. It continues this process of rotation until the end of the key-bar enters the slot in the lower end of the cam. At this point the disk will be found to have rotated to such a point that the letter on the key which has been depressed is the same letter as that which has been brought beneath the end of the hammer. As the stroke continues, the key-bar continues to descend until it strikes the arm on the type-plate shaft or rod, which arm it causes to descend into the slot on the cam, and then into the lock-slots on the ring about the base of the guide-barrel. Here it is securely locked, so that neither the cam, sleeve, rod, or type-disk can further rotate.

The continuation of the stroke by the action of the key-bar on the arm from the rod forces the rod to descend until the type is brought upon the disk in close proximity to the ribbon. The collar on the rod then engages or bears upon the upper part of the hammer and forces it down, so that its outer end strikes the type-disk above the type to be used and causes it to make an impression. It will be observed that, the type-disk descending in the right line and the hammer being pivoted at one end, its outer end will travel a greater distance than the type-disk, and thus will strike a blow against the outer edge of such disk. When the key-bar is released, it is immediately forced upward into its normal position by the spring in the spring-pocket. The next key used produces the same result. If now it is desired to space without the use of the type, the spacer-key is depressed and the rod, type-plate, and hammer are depressed, not far enough, however, to make an impression upon the type, but just far enough to cause the tripping segment-plate on the type-bar to release the escapement and permit the carriage to travel the space of one letter. As the hammer descends during such action the slotted segment which it bears begins to rotate in the disks of the two slotted plates which form the escapement. It first releases the lower plate, which is then carried around the distance of the slot in the upper plate by means of the spring, which is secured to the pin on the base of the upper plate and bears against the pin on the lower plate, which projects through the slot. When the carriage is carried back to the right of the machine to start its motion, the escapement is locked, so as not to operate by the segment; but the rack is permitted to move by the rotation of the shaft, which carries the ratchet-wheel about and does not rotate either of the slotted disks. When it is desired to examine the work, the case is elevated, carrying with it the ribbon-operating mechanism and all the printing mechanism, and leaving nothing except the printing-roller and pointer, which points directly at the letter last printed. The paper is operated to write a new line, as indicated above. As the paper-carriage or printing-roller travels back and forth, it extends over the end of the base of the machine.

I claim—

1. The combination of a guide-barrel having vertical guideways, a collar having lock-slots to register with such ways in the base thereof, and key-bars pivoted concentric with such barrel and moving in said ways, and a type wheel and shaft within said barrel.

2. In a type-writer, a miter-shaped cam with a sharp edge above and a slot below, in combination with a type-plate and rod secured together, so that the rod and plate rotate with the cam and the rod reciprocates in the sleeve.

3. The combination of a type-plate and rod and sleeve, the latter suspended so as to rotate freely with the miter-shaped cam, having a sharp edge above and a slot below, said cam secured on the sleeve, an arm on the rod which extends into the vertical slot on the cam, so that the rod and plate rotate with the cam and reciprocate in the sleeve.

4. The combination of a type-plate and rod and suspending sleeve with a cam shaped as shown, an arm from said rod projecting into the slot on the cam, and a collar provided with locking-slots, which receive the arm from the rod, and thus lock the plate from further rotation.

5. The combination of a type-plate, central rod, and suspending sleeve with a cam shaped as shown on said sleeve, guide-barrel concentric therewith, a collar provided with locking-slots at the base thereof, and an arm on the rod, whereby the cam and rod are locked together and both are locked from further rotation when the arm enters the lock-slots.

6. The combination of a type-plate, rod, and suspending sleeve with cam shaped as shown, a guide-barrel and collar with locking-slots, an arm on the rod projecting into the slot on the cam, and key-bars concentric with the barrel, which, when depressed, rotate the cam and plate, and then by forcing the arm on the rod into a lock-slot prevents the whole from further rotation.

7. Suitable guides, a type-plate and rod, and suspending sleeve, an arm on said rod, a cam attached to such sleeve and shaped as shown, with a sharp edge above and a slot below, and key-bars, the inner ends of which rest above said cam, so that when they are depressed they first rotate the cam and type-plate, then by engaging the slot in said cam lock the plate in position, and then by engaging the arm on said rod cause the plate to descend.

8. In a type-writer, the combination of a hammer, a type-plate provided with a supporting-rod under the same, a collar on said rod just above the hammer and adapted to engage the same, a sleeve which encircles said rod, an arm on said rod, a cam shaped as shown and secured to the sleeve, and key-bars, which engage the cam and by being depressed cause the same, together with the plate, until the collar on the rod engages the hammer and causes said hammer to strike the back of the edge of said type-plate and make the impression.

9. The combination of a pivoted hammer provided with a hammer at one end, and type-plate, rod, and collar which engages the hammer, pivoted keys and lock-slots, and a cam about the rod, so that the keys first turn the cam and type-plate in a proper position, then depress the plate and hammer, at the same time locking them to prevent further rotation.

10. The combination of a paper-carriage, an escapement mechanism which limits its motion, a hammer having a tripping-edge which operates the escapement, a type-wheel, a rod thereon which operates the hammer, and a spacer which engages such rod and slightly depresses it, so as to cause the tripping-edge on the hammer to operate the escapement and permit the carriage to move, but not to cause the bar to depress the type.

11. A type-case supported at one end by arms from the rock-shaft, and at the other upon guides parallel with the case, with a second arm attached to the same rock-shaft, and keys which reciprocate in the type-case, and by being depressed against the second arm rotate the rock-shaft and slide the type-case on its guides.

12. A ribbon, in combination with a paper-carriage with an inclined way thereon, a rock-shaft at right angles thereto, provided at one end with a rock-arm which is engaged and raised by the inclined way, and at the other with an arm, a sleeve on the central shaft, a pin from the latter arm, which engages such sleeve and ribbon-actuated mechanism, which receives its motion from the sleeve as it is reciprocated on the shaft.

13. In a ribbon-moving device, the combination of a ribbon-roll having a ratchet-wheel with a ratchet-bar pivoted at one end, held against the ratchet by the spring and adapted to be lifted therefrom by means of a cam-wheel.

14. The combination of a rock-shaft operated by the motion of the carriage, a sleeve on the central supporting-shaft, operated by the rock-shaft, a lever operated by the sleeve, and a ratchet-bar and ratchet-wheel which it engages on the ribbon-roll.

15. In a type-writer, the combination of a type-case which supports the type and a hammer and a supporting-shaft, on which the case and the bar are pivoted.

THOMAS B. HARRISON.

Witnesses:
SAMUEL J. SEIFRIED,
FRANCIS W. PARKER.